United States Patent [19]

Kreidler et al.

[11] 4,360,837

[45] Nov. 23, 1982

[54] CATHODE RAY TUBE SUPPORT SYSTEM

[75] Inventors: James F. Kreidler; Ralph E. Neuber, both of Ottawa, Ohio; Harry R. Swank, Waterloo, N.Y.

[73] Assignee: North American Philips Consumer Electronics Corp., New York, N.Y.

[21] Appl. No.: 167,610

[22] Filed: Jul. 11, 1980

[51] Int. Cl.³ .......................... H04N 5/65; H01J 29/02
[52] U.S. Cl. .............................. 358/246; 220/2.1 A; 358/248
[58] Field of Search ............................ 358/246, 248; 220/2.1 A

[56] References Cited

U.S. PATENT DOCUMENTS

| | | | |
|---|---|---|---|
| 3,350,154 | 10/1967 | Minneman | 358/246 |
| 3,412,600 | 11/1968 | Powell | 358/246 |
| 3,626,093 | 12/1971 | Inglis | 358/246 |
| 3,996,491 | 12/1976 | Larson | 358/246 |
| 4,210,935 | 7/1980 | Mitchell | 358/246 |

FOREIGN PATENT DOCUMENTS

| | | | |
|---|---|---|---|
| 1933312 | 4/1979 | Fed. Rep. of Germany | 358/246 |
| 1532634 | 6/1968 | France | 358/246 |
| 54-129872 | 10/1979 | Japan | 358/246 |

*Primary Examiner*—Howard Britton
*Attorney, Agent, or Firm*—Thomas A. Briody; Jack Oisher; John C. Fox

[57] ABSTRACT

The invention relates to an improved multiple-bracket system for supporting a banded implosion resistant CRT in an operating position. Discretely formed slots in the rimband components of the combination enable the compatibly formed mounting brackets to be laterally shifted to exact positionings prior to affixal tightening of the tension banding thereover.

11 Claims, 16 Drawing Figures

CATHODE RAY TUBE SUPPORT SYSTEM

TECHNICAL FIELD

This invention relates to means for supporting a cathode ray tube and more particularly to an improved support arrangement providing discrete means for effecting lateral adjustment of the mounting brackets in an implosion-resistant system.

BACKGROUND ART

Cathode ray tubes, especially those types employed in television and allied display applications, often utilize tube support systems associated with implosion-resistant means in the form of a tensioned metallic encompassment of the forward region of the tube envelope adjacent the viewing area. Tubes of this construction often employ a plurality of spaced-apart substantially L-shaped supporting brackets having a seating basal portion and a related integral upstanding ear-like appendage. Such tube-supporting brackets are usually retained in a sandwiched manner between the surface of the tube envelope and a superjacent metallic banding tightly tensioned thereover to provide the intended implosion-inhibiting characteristics for the tube.

In certain tube support systems, a pair of like rimband components having the supporting brackets affixed thereon, are added to the encompassing construction, such being oppositely positioned, in a tube encircling manner, between the envelope surface and the overlying tensioned banding. Each of the rimband components contains two brackets which are spaced and attached thereto, in accordance to specifications for a standard tube, prior to placement of the rimbands about the tube. Unfortunately, there are times when the pertinent envelope dimensional tolerances and those of the bracket-containing rimbands conjunctively contribute to a mismatch whereby the rimbands are either stretched or buckled when the tensioned banding is applied. Such causes a shifting of the brackets from their intended positionings and unduly stresses the tensioned combination.

DISCLOSURE OF THE INVENTION

It is therefore an object of this invention to reduce and obviate the aforementioned disadvantages evidenced in the prior art. Another object of the invention is to provide an improved tube support system wherein a bracket placement arrangement compensates for a mismatch of envelope and rimband dimensional tolerances.

These and other objects and advantages are accomplished in one aspect of the invention by the provision of a discretely slotted modification of the rimband components wherein compatibly modified brackets are accommodated. This arrangement allows for limited lateral adjustment of the brackets whereby their intended positionings are beneficially achieved and maintained. These modifications incorporated into the improved support system eliminate the aforementioned deleterious stresses from the tensioned combination.

BEST MODE FOR CARRYING OUT THE INVENTION

For a better understanding of the present invention together with the advantages and capabilities thereof, reference is made to the following specification and appended claims in connection with the aforedescribed drawings.

While the invention is illustrated as being formed for utilization with a cathode ray tube of substantially rectangular shaping, the teachings of the disclosure are intended to be equally applicable to usage with other tube envelope forms, such as round or ovate shapings.

Figure 1:
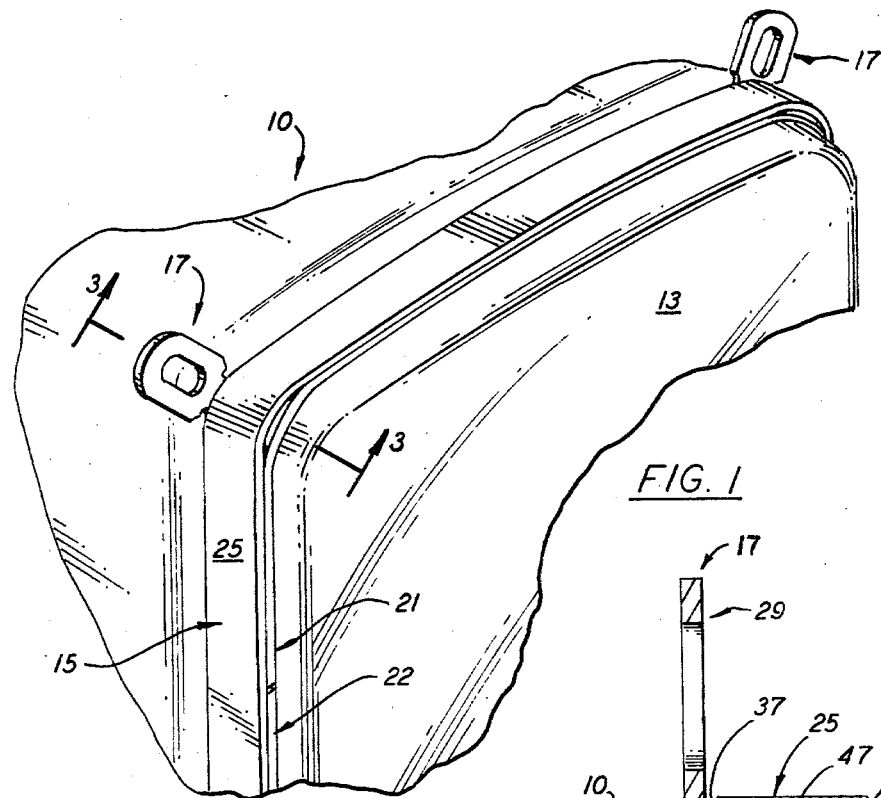
FIG. 1 is a partial perspective of the forward portion of a cathode ray tube illustrating utilization of the implosion-inhibiting encompassment incorporating the improved tube support system of the invention.

With reference to the drawings, there is shown in FIG. 1 a partial frontal perspective of the forward portion of a cathode ray tube 10. Surrounding the forward region of the tube envelope, adjacent the viewing area 13 thereof, is the improved tube support system 15 of the invention utilizing a plurality of spaced-apart mounting brackets 17 in association with an implosion-inhibiting encompassing combination comprising a pair of rimband components 21 and 22 and an overlying tensioned banding 25. For a detailed description of the initial embodiment, reference is directed to FIGS. 1 through 6.

Usually a plurality of four substantially L-shaped mounting bracket members 17 are employed in the support system 15; each being formed of a rigid material, such as metal or plastic, and evidencing a basal portion 27 having an integral ear-like appendage 29 upstanding therefrom. This appendage contains an aperture 31 to accommodate means for facilitating subsequent attachment of the mounting bracket to a display placement means, not shown. The basal portion 27 is shaped to conform to a perimetrical surface region of the tube and evidences inclined edge regions 33 and 35 which are transverse to the tensioned banding 25. The upper and lower surfaces 37 and 39 of the basal portion are discretely modified, as will be described, to be compatible with defined regions of the associated rimband components.

The pair of rimband components 21 and 22 are similarly fashioned, in this instance as substantially U-shaped members, and oppositely positioned in the surface of the tube 10 to contiguously surround the perimetrical region of the viewing area. Each of the rimband components 21 and 22 has a plurality of designated arcuate attachment regions 41 whereat each of the respective mounting brackets is suitably positioned. As exemplarily shown, these attachment regions are substantially at the bend regions of the U-shaped rimband components. The invention is directed to modification of at least one attachment region 41 of each rimband component and to conjunctive modification of the basal portion 27 of the respective mounting bracket 17 associated therewith.

Figure 2A:
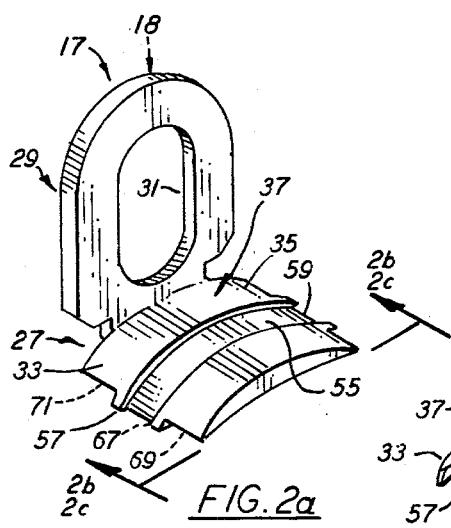
FIG. 2a is a perspective of an improved bracket illustrating the invention.
Figure 2B:
FIGS. 2b and 2c are frontal views taken along the line 2b, 2c—2b, 2c of FIG. 2a showing differing lower surface modifications of the bracket.
Figure 5:
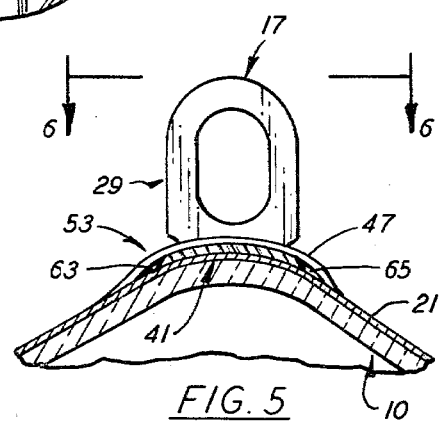
FIG. 5 is a frontal sectional view of the same taken along the line 5—5 of FIG. 4.
Figure 6:
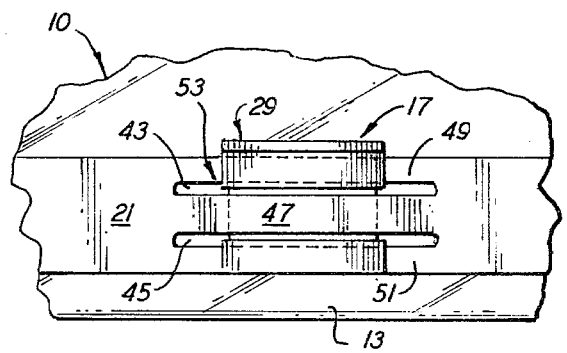
FIG. 6 is a plan view of the combination taken along the line 6—6 of FIG. 5.

In accordance with one aspect of the invention, rimband material at the bracket attachment region 41 has two parallel longitudinal slits 43 and 45 incised therein to form a central 47 and two side-related ribbon segments 49 and 51. The central segment 47 is shaped slightly outward from the body plane of the rimband material, with the two longitudinally-spaced and side-related segments 49 and 51 remaining in the body plane in a manner to be contiguous with the glass surface of the tube envelope 10. This shaping forms a slot-like bracket attachment means 53 fashioned to receive the compatibly modified basal portion 27 of the bracket 17. The upper surface 37 of the basal portion has a longitudinal lateral recess 55 formed substantially centrally therein to accommodate the shaped outer central ribbon segment 47. As shown in FIGS. 2a and 2b, the lower surface 39 of the basal portion has two protuberances 57 and 59 extending downward therefrom, one from each of the edge regions 33 and 35. Such modifications can be exemplarily formed by coining procedures. These spatially related protuberances project into the spacing 61 between the side-related ribbon segments 49 and 51. The slot-like bracket attachment means 53, as delineated in FIGS. 5 and 6, is formed to have sufficient internal clearance to allow positioning of the bracket portion therein and to have small end spacings 63 and 65 to permit a slight lateral shift of the bracket, if such is required to achieve proper alignment of the mounting aperture 31. A one-piece banding strap 25 is superjacently positioned in a tube encompassing manner upon the rimband-bracket combination illustrated in FIGS. 4 and 5. The strap is determinately tensioned thereabout to compress and securely affix the rimband components and the positionally adjusted brackets, while at the same time effecting implosion-resistant characteristics to the tube.

Figure 3:
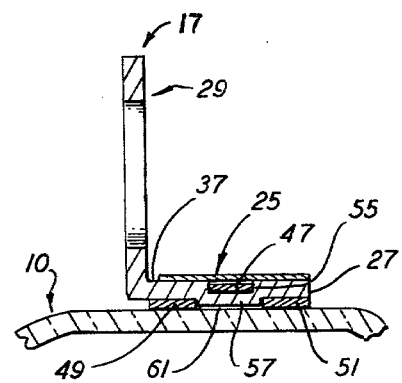
FIG. 3 is a sectional view of the support system taken along the line 3—3 of FIG. 1.

It is to be noted, as shown in FIG. 3, the projections of the protuberances from the lower surface 39 of the basal portion do not exceed the thickness of the rimband material. These dimensional considerations enable the side-related rimband segments 49 and 51 to securely seat on the surface of the tube. Thus, adhering positional stability is imparted to the combined elements comprising the support system.

Figure 2C:
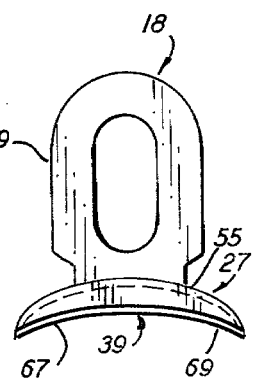
Figure 4:
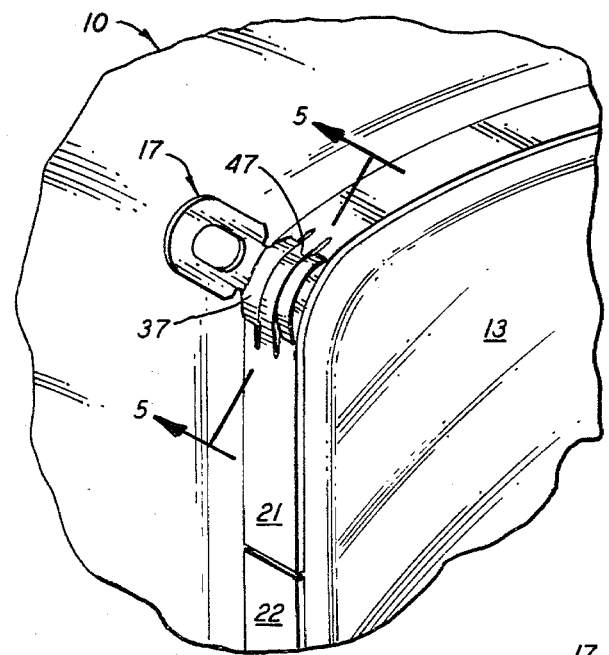
FIG. 4 is a perspective showing the accommodation of the modified bracket in the formed rimband.

The FIG. 2a perspective view of the bracket 17 also illustrates a bracket 18 embodiment which concerns another modification of the lower surface 39 of the basal portion 27, as detailed in FIG. 2c, wherein a laterally oriented central raised element 67 effects two parallel lateral edge-related recesses 69 and 71. These are formed forward and rearward to accept the spaced apart side-related ribbon segments 49 and 51. Such modifications are indicated in phantom in FIG. 2a. In this FIGS. 2a and 2c embodiment, the two edge-related recesses 69 and 71, formed in the lower surface 39 of the bracket basal portion 27, have substantially like depths not exceeding the thickness of the rimband material to insure positive seating of the rimband ribbon segments 49 and 51 on the surface of the tube. The overlying banding 25 is thence applied as illustrated in FIG. 1, to complete the tube supportive system.

Figure 7:
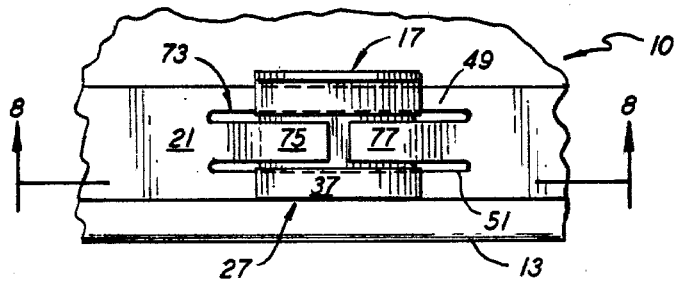
FIGS. 7 and 8 are views illustrating a modification of the formed rimband shown in FIGS. 4 through 6.
Figure 8:
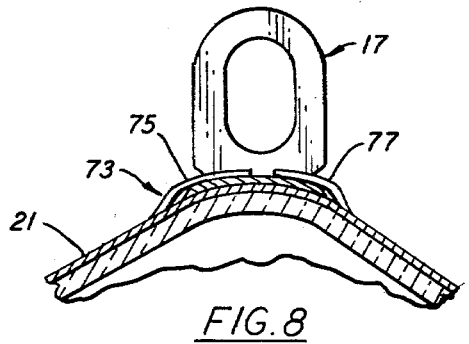

A modification of the slot-like bracket attachment means 53 is illustrated in FIGS. 7 and 8, and indicated as 73, wherein the central ribbon segment 47 is cut transversely, at substantially the mid point thereof, to form two opposed tongue-like members 75 and 77. This multiple element construction enables the bracket basal portion 27 to be seated on the ribbon segments 49 and 51, whereupon the tongue members 75 and 77 are bent down to seat in the upper surface recess 55. This construction enables rapid assembly and is adaptable to mechanical assembly of the bracket to the rimband.

Figure 9:
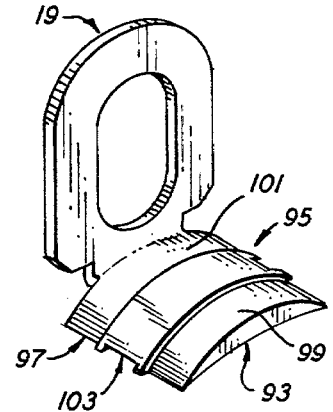
FIGS. 9, 10 and 11 illustrate another embodiment of the invention.
Figure 10:
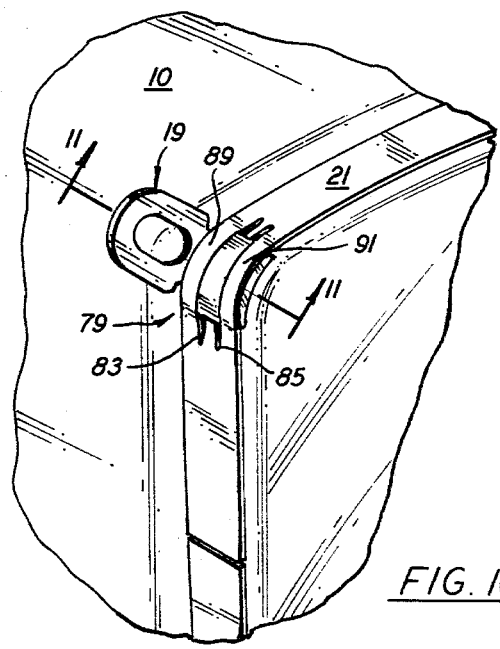
Figure 11:
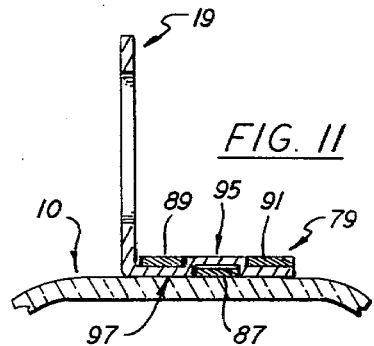

Another embodiment of the invention is shown in FIGS. 9, 10 and 11, wherein the mounting bracket 19 is accommodated in the slot-like attachment means 79. In this embodiment, the two parallel longitudinal slits 83 and 85 incised in the rimband material 21 form a substantially central ribbon segment 87 and two side-related ribbon segments 89 and 91. In the shaping of the slot-like bracket attachment means, the central ribbon segment 87 remains in the body plane of the rimband material, and as such, is in contact with the surface of the tube. The longitudinal side-related segments 89 and 91 are shaped slightly outward therefrom to form the slot or pocket-like construction 79. The basal portion 93 of bracket 19 is modified accordingly. The upper surface 95 has two parallel lateral edge-related recesses 99 and 101 formed at forward and rearward orientations therein to accommodate seating of the shaped side-related ribbon segments 89 and 91. The lower surface 97 has a laterally-oriented longitudinal recess 103 formed substantially centrally therein to accept the central ribbon segment 87.

To facilitate proper seating of this embodiment of the support system, the centrally and laterally oriented recess 103 formed in the lower surface 97 of the bracket basal portion 93 evidences a depth at least equal to the thickness of the rimband material. This permits maximum contact of the bracket with the surface of the envelope. To complete the support system, the tensioned banding 25 is applied thereover as shown in FIG. 1.

Figure 13:
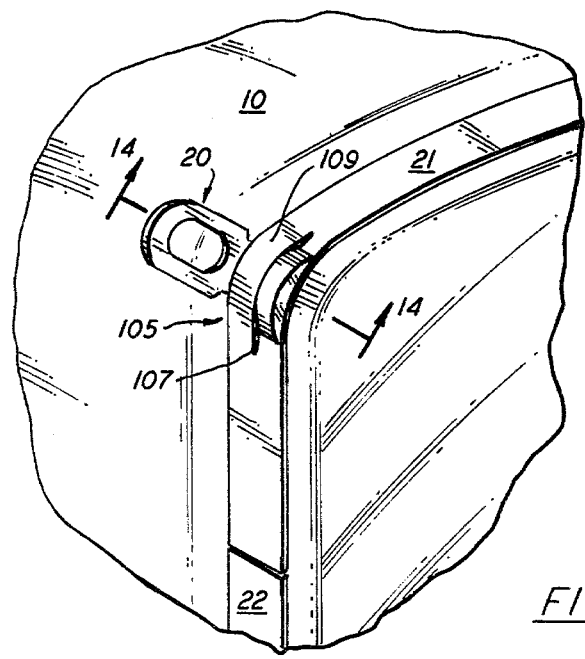
FIGS. 12, 13 and 14 detail an additional embodiment of the invention.
Figure 12:
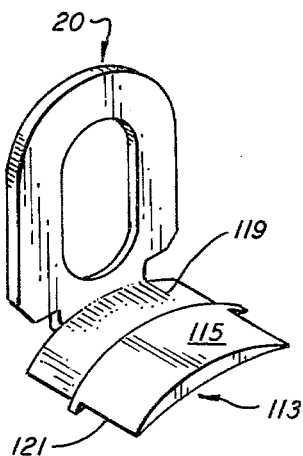
Figure 14:
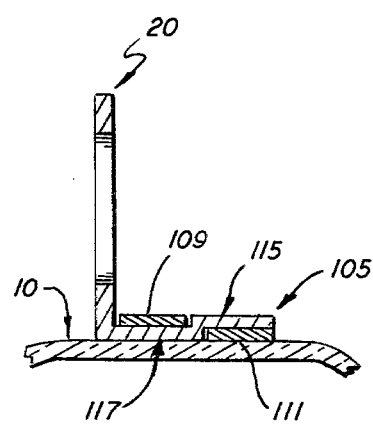

An additional embodiment of the invention is illustrated in FIGS. 12, 13 and 14 wherein the modified bracket 20 is suitably accommodated in the slot-like attachment means 105. In this embodiment, one substantially central longitudinal slit 107 is incised in the rimband material 21, thereby forming two parallel ribbon segments 109 and 111. As shown, segment 111 remains in the body plane of the rimband material, and is in contact with the surface of the rube. The other segment 109 is shaped slightly outward therefrom to form the slot-like bracket-receiving construction 105. The basal portion 113 of the bracket 20 is modified accordingly. The upper surface 115 has a lateral edge-related recess 119 formed therein to accommodate the seating of the shaped segment 109. Likewise, the lower surface 117 has a lateral edge-related recess 121 formed to accept the ribbon segment 111. The depths of the respective recesses are substantially equal to the thickness of the rimband material to provide beneficial seating of the bracket-rimband assembly on the tube and to afford desired contact area with the overlying banding 25, such as that shown in FIG. 1. In keeping with the concept of this embodiment, it is evident that the slot-like attachment pocket can be formed by reversing the shapings of the ribbon segments, whereupon the compatible recesses in the bracket member are reversed to achieve a mated assembly.

While there have been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

The aforedescribed implosion-inhibiting tube support system, incorporating "floating" mounting brackets in discretely slotted regions of the rimbands, provides a marked improvement in the multiple-bracket system employed for supporting a banded cathode ray tube in an operating environment. The modified mounting brackets, accommodated in their discretely formed rimband attachment slots, are permitted limited lateral adjustments whereby proper bracket positionings are facilely achieved prior to banding without the danger of buckling or stretching the rimbands. Additionally, the formed recess areas of the brackets, and the conjunctive rimband attachment regions of the rimbands, provide an assembly which prevents twisting or pull-out of the brackets. Thus, the invention eliminates localized deleterious stressing of the banding combination. As a result, banding rejects are minimized, overall tube quality improved, and tube manufacturing costs reduced.

What is claimed is:

1. An improved cathode ray tube support system utilizing spaced-apart mounting means associated with an implosion-inhibiting tensioned encompassment of the forward region of the tube envelope adjacent the viewing area thereof, said improved system being a combination comprising:

tube mounting means in the form of a plurality of substantially L-shaped mounting bracket members each having an apertured ear-like appendage integrally upstanding from a basal portion evidencing upper and lower surfaces having modifications therein and whereof the lower surface is shaped to substantially conform with the contour of said tube envelope at desired attachment locations, said basal portion having inclined edge regions transverse to said tensioned encompassment;

a pair of similarly fashioned rimband components compatibly shaped of a material of defined thickness, said rimbands being oppositely positioned on said tube to contiguously surround the perimetrical region of said viewing area, each of said components having a plurality of designated arcuate attachment regions whereat said mounting bracket members are positioned; at least one of said bracket attachment regions having at least one longitudinally defined slit incised in said rimband material at said region to create a formation of demarcated parallel ribbon segments thereat, at least one of said segments being materially shaped in a selectively defined manner outward from the body plane of the rimband material to provide a ribbon-defined slot-like construction wherein the basal portion of said bracket is contiguously accommodated in a manner to permit a limited degree of lateral adjustment of said bracket at said attachment region to insure accurate orientation thereof; and a one-piece banding strap superjacently positioned in a tube encompassing manner upon said related rimband components and said spatially associated mounting brackets, said strap being determinately tensioned thereabout to securely affix said rimband components and said positionally adjusted brackets while effecting implosion-resistant characteristics to said tube.

2. The improved cathode ray tube support system according to claim 1 wherein the upper and lower surfaces of said bracket basal portion are compatibly modified to provide discrete seatings for the respective shaped ribbon segments comprising said slot-like construction.

3. The improved cathode ray tube support system according to claim 2 wherein the slot-like bracket attachment means incorporated in said rimband is fashioned of the material resultant from two parallel longitudinal slits incised therein forming a substantially central and two side-related ribbon segments, said central segment being shaped slightly outward from the body plane of said rimband material with the longitudinally-spaced side-related segments remaining in said body plane in a manner to be contiguous with the glass surface of said envelope; said bracket basal portion having a longitudinal lateral recess formed substantially centrally in the upper surface thereof to accommodate the shaped outer central ribbon segment, and said lower seating surface having a protuberance extending downward from substantially the mid-area of each of said edge regions into the spacing between said side-related ribbon segments.

4. The improved cathode ray tube support system according to claim 3 wherein said centrally oriented lateral recess in the upper surface of said bracket basal portion has a depth at least equalling the thickness of said rimband material, and wherein the projections of the protuberances from the lower seating surface of said bracket do not exceed the thickness of said rimband material.

5. The improved cathode ray tube support system according to claim 2 wherein the slot-like bracket attachment means incorporated in said rimband is fashioned of the material resultant from two parallel longitudinal slits incised therein forming a substantially central and two side-related ribbon segments, said central segment being shaped slightly outward from the body plane of said rimband material with the longitudinally-spaced side-related segments remaining in said body plane in a manner to be contiguous with the glass surface of said envelope; said bracket basal portion having a longitudinal lateral recess formed substantially centrally in the upper surface thereof to accommodate the shaped outer central ribbon segment, and said lower seating surface having two parallel lateral edge-related recesses formed at forward and rearward orientations therein to accept said spaced apart side-related ribbon segments.

6. The improved cathode ray tube support system according to claim 5 wherein said two lateral edge-related recesses formed in the lower seating surface of said bracket basal portion have substantially like depths not exceeding the thickness of said rimband material.

7. The improved cathode ray tube support system according to claim 3 wherein said central ribbon segment is cut transversely at substantially the mid-point thereof to form two opposed tongue-like members, such being suitably accommodated in the upper surface recess in the basal portion of said bracket.

8. The improved cathode ray tube support system according to claim 2 wherein the slot-like bracket attachment means in said rimband is fashioned from the material resultant from two parallel longitudinal slits incised therein forming a substantially central and two side-related ribbon segments, said central segment remaining in the body plane of said rimband material with the longitudinally-spaced side-related segments being shaped slightly outward therefrom; said bracket basal portion having two parallel lateral edge-related recesses formed in the upper surface thereof to accommodate said side-related ribbon segments, and said lower seating surface having a laterally-oriented longitudinal recess formed substantially centrally therein to accept said central ribbon segment.

9. The improved cathode ray tube support system according to claim 8 wherein said centrally and laterally oriented recess formed in the lower surface of said bracket basal portion evidences a depth at least equal to the thickness of said rimband material.

10. The improved cathode ray tube support system according to claim 2 wherein the slot-like bracket attachment means in said rimband has one substantially central longitudinal slit incised in said rimband material forming two parallel ribbon segments, one of said segments being shaped slightly outward from the plane of said body material with the other segment remaining in the body plane thereof; said bracket basal portion having recesses formed in the upper and lower surfaces thereof to accommodate seating placement of said respective ribbon segments.

11. The improved cathode ray tube support system according to claim 10 wherein the depths of the respective recesses formed in the upper and lower surfaces of said bracket basal portion are substantially equal to the thickness of said rimband material.

* * * * *